United States Patent
Yu et al.

(10) Patent No.: US 11,042,005 B2
(45) Date of Patent: Jun. 22, 2021

(54) ACTUATOR OF CAMERA MODULE

(71) Applicant: SAMSUNG ELECTRO-MECHANICS CO., LTD., Suwon-si (KR)

(72) Inventors: Je Hyeon Yu, Suwon-si (KR); Sung Man Pang, Suwon-si (KR); Youn Joong Lee, Suwon-si (KR); Ja Hwi Cho, Suwon-si (KR); Jin Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 255 days.

(21) Appl. No.: 16/000,099

(22) Filed: Jun. 5, 2018

(65) Prior Publication Data

US 2019/0129133 A1    May 2, 2019

(30) Foreign Application Priority Data

Oct. 31, 2017    (KR) .......................... 10-2017-0143592

(51) Int. Cl.
*G02B 7/10*         (2021.01)
*G02B 27/64*        (2006.01)
*G02B 7/08*         (2021.01)

(52) U.S. Cl.
CPC ............ *G02B 7/102* (2013.01); *G02B 7/08* (2013.01); *G02B 27/646* (2013.01)

(58) Field of Classification Search
CPC .... G02B 27/646; G02B 15/173; G02B 15/14; G02B 15/177; G02B 7/08; G02B 15/16;

(Continued)

(56) References Cited

U.S. PATENT DOCUMENTS

| 4,816,759 A | 3/1989 | Ames et al. |
| 5,146,071 A | 9/1992 | Ookubo et al. |

(Continued)

FOREIGN PATENT DOCUMENTS

| CN | 102272557 A | 12/2011 |
| CN | 103176331 A | 6/2013 |

(Continued)

OTHER PUBLICATIONS

Chinese Office Action dated Apr. 24, 2020 issued in the corresponding Chinese Patent Application No. 201811219195.3 (18 pages in English, 14 pages in Chinese).

*Primary Examiner* — Collin X Beatty
*Assistant Examiner* — Grant A Gagnon
(74) *Attorney, Agent, or Firm* — NSIP Law

(57) ABSTRACT

An actuator including two or more detection targets disposed on a surface and another surface of a lens barrel, respectively, an oscillating unit including a first oscillation circuit unit including two or more oscillation circuits disposed to face the surface and a second oscillation circuit unit including two or more oscillation circuits disposed to face the other surface to output oscillation signals, and a determining unit to calculate a position of the lens barrel from the oscillation signals output from the oscillating unit. A frequency range of an oscillation signal output from any one of the two or more oscillation circuits of the first oscillation circuit unit is different from that of an oscillation signal output from any one of the two or more oscillation circuits of the second oscillation circuit unit.

17 Claims, 3 Drawing Sheets

(58) Field of Classification Search
CPC .......... G02B 15/22; G02B 7/09; G02B 13/18;
G02B 13/009; G02B 27/64; G02B 7/04;
G02B 13/02; G02B 15/20; G02B
13/0015; G02B 13/0045; G02B 15/15;
G02B 27/0025; G02B 15/167; G02B
15/17; G02B 9/62; G02B 9/64; G02B
13/001; G02B 13/04; G02B 15/163;
G02B 7/023; G02B 7/102; G02B
13/0065; G02B 15/10; G02B 23/02;
G02B 7/02; G02B 7/022; G02B 7/14;
G02B 9/00; G02B 9/04; G02B 9/34;
G02B 9/60; G02B 13/002; G02B 13/004;
G02B 13/06; G02B 13/16; G02B 15/12;
G02B 15/142; G02B 17/08; G02B
17/0804; G02B 17/0808; G02B 17/0896;
G02B 21/26; G02B 26/004; G02B
26/0808; G02B 26/0816; G02B 27/0911;
G02B 27/644; G02B 3/14; G02B 7/021;
G02B 7/025; G02B 7/18; G02B 7/24;
G02B 7/28; G02B 9/24

USPC ......................................................... 359/557
See application file for complete search history.

(56) References Cited

U.S. PATENT DOCUMENTS

| | | |
|---|---|---|
| 2005/0168584 A1 | 8/2005 | Uenaka |
| 2008/0185526 A1* | 8/2008 | Horak ...................... G01J 5/08 250/353 |
| 2011/0304345 A1 | 12/2011 | Hrubes |
| 2013/0163085 A1 | 6/2013 | Lim et al. |
| 2018/0074283 A1 | 3/2018 | Ko et al. |

FOREIGN PATENT DOCUMENTS

| | | |
|---|---|---|
| JP | 4390347 B2 | 12/2009 |
| JP | 2012-177755 A | 9/2012 |
| JP | 2014-92482 A | 5/2014 |
| KR | 10-2013-0077216 A | 7/2013 |

* cited by examiner

ACTUATOR OF CAMERA MODULE

CROSS-REFERENCE TO RELATED APPLICATIONS

This application claims the benefit under 35 USC 119(a) of Korean Patent Application No. 10-2017-0143592 filed on Oct. 31, 2017, in the Korean Intellectual Property Office, the entire disclosure of which is incorporated herein by reference for all purposes.

BACKGROUND

1. Field

This application relates to an actuator of a camera module.

2. Description of the Background

Recently, portable communications terminals such as cellular phones, personal digital assistants (PDAs), portable personal computers (PCs), and the like, have generally been implemented with the ability to perform the transmission of video data as well as the transmission of text or audio data. In accordance with such a trend, camera modules have recently become standard in portable communications terminals to enable the transmission of video data, allow for video chatting, and the like.

Generally, a camera module includes a lens barrel having lenses disposed therein, a housing to accommodate the lens barrel therein, and an image sensor to convert an image of a subject into an electrical signal. A single focus type camera module to capture an image of a subject at a fixed focus may be used as the camera module. However, recently, in accordance with the development of technology, a camera module including an actuator enabling autofocusing (AF) has been used. In addition, a camera module may include an actuator for optical image stabilization (OIS) in order to suppress a resolution decrease phenomenon due to hand-shake.

The above information is presented as background information only to assist with an understanding of the present disclosure. No determination has been made, and no assertion is made, as to whether any of the above might be applicable as prior art with regard to the disclosure.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator includes two or more detection targets disposed on a surface and another surface of a lens barrel, respectively, an oscillating unit including a first oscillation circuit unit including two or more oscillation circuits disposed to face the surface and a second oscillation circuit unit including two or more oscillation circuits disposed to face the other surface to output oscillation signals, and a determining unit configured to calculate a position of the lens barrel from the oscillation signals output from the oscillating unit. A frequency range of an oscillation signal output from any one of the two or more oscillation circuits of the first oscillation circuit unit is different from that of an oscillation signal output from any one of the two or more oscillation circuits of the second oscillation circuit unit.

A frequency range of an oscillation signal output from any one of the two or more oscillation circuits of any one of the first oscillation circuit unit and the second oscillation circuit unit may be different from that of an oscillation signal output from another of the two or more oscillation circuits.

The frequency range of the oscillation signal output from the one of the two or more oscillation circuits of the first oscillation circuit unit may be the same as that of an oscillation signal output from another of the two or more oscillation circuits of the second oscillation circuit unit.

The surface and the other surface of the lens barrel may oppose each other in relation to an optical axis of the lens barrel.

Each of the two or more oscillation circuits of the first oscillation circuit unit and the two or more oscillation circuits of the second oscillation circuit unit may include a sensing coil and a capacitor.

The sensing coils of the two or more oscillation circuits of the first oscillation circuit unit may be disposed in a direction perpendicular to an optical axis of the lens barrel. The sensing coils of the two or more oscillation circuits of the second oscillation circuit unit may be disposed in the direction perpendicular to the optical axis of the lens barrel.

The frequency range of the oscillation signal output may be determined depending on a capacitance of the capacitor.

In another general aspect, an actuator includes two or more detection targets disposed on a surface and another surface of a lens barrel, respectively, an oscillating unit, a computing unit, and a determining unit. The oscillating unit includes a first oscillation circuit unit including two or more oscillation circuits disposed to face the surface and configured to output oscillation signals including different frequency ranges and a second oscillation circuit unit including two or more oscillation circuits disposed to face the other surface and configured to output oscillation signals including different frequency ranges. The computing unit is configured to compute frequencies of the oscillation signals output from the oscillating unit. The determining unit is configured to calculate a position of the lens barrel from the frequencies of the oscillation signals, wherein a frequency range of an oscillation signal output from any one of the two or more oscillation circuits of the first oscillation circuit unit is the same as that of an oscillation signal output from any one of the two or more oscillation circuits of the second oscillation circuit unit.

The determining unit may be configured to calculate the position of the lens barrel depending on a ratio between frequencies of oscillation signals output from oscillation circuits of each of the first oscillation circuit unit and the second oscillation circuit unit, having the same frequency range.

The two or more oscillation circuits of the first oscillation circuit unit may be disposed in a first direction perpendicular to an optical axis, and the two or more oscillation circuits of the second oscillation circuit unit may be disposed in the first direction.

The determining unit may be configured to calculate a position of the lens barrel in the first direction by summing a difference between the oscillation signals output from the two or more oscillation circuits of the first oscillation circuit unit and a difference between the oscillation signals output from the two or more oscillation circuits of the second oscillation circuit unit.

The determining unit may be configured to calculate a position of the lens barrel in a second direction by summing a difference between oscillation signals output from two or more oscillation circuits disposed at one side in the first direction among the two or more oscillation circuits of each of the first oscillation circuit unit and the second oscillation circuit unit and a difference between oscillation signals output from two or more oscillation circuits disposed at the other side in the first direction among the two or more oscillation circuits of each of the first oscillation circuit unit and the second oscillation circuit unit, the second direction being different from the first direction and perpendicular to the optical axis.

Each of the two or more oscillation circuits of the first oscillation circuit unit and the two or more oscillation circuits of the second oscillation circuit unit may include a sensing coil and a capacitor.

An inductance of the sensing coil included in each of the first oscillation circuit unit and the second oscillation circuit unit may be changed in response to movement of the lens barrel.

A capacitance of the capacitor in each of the first oscillation circuit unit and the second oscillation circuit unit may determine the frequency range of the oscillation signal.

Two or more sensing coil of the first oscillation circuit unit and two or more sensing coil of the second oscillation circuit unit may be provided to be symmetrical to each other in relation to a plane formed by an optical axis direction and a first direction, perpendicular to an optical axis.

In another general aspect, an actuator includes a driving device configured to output a driving signal in response to an input signal and a feedback signal, driving coils configured to move a lens barrel in two different directions perpendicular to an optical axis of the lens barrel in response to the driving signal, detection targets disposed on the lens barrel, oscillation circuits configured to output frequencies of oscillation signals in response to a position of the detection targets, and a determining unit configured to calculate the position of the lens barrel in the two different directions in response to the frequencies of the oscillation signals, and output the feedback signal in response to the calculation.

The oscillation circuits may be disposed extending in a first of the two directions on opposing sides of the lens barrel in a second of the two directions.

An oscillation circuit among the oscillation circuits may be configured to output a frequency of an oscillation signal in a frequency range different from that of an oscillation circuit among the oscillation circuits disposed on the opposing side of the lens barrel.

The oscillation circuit among the oscillation circuits may be configured to output a frequency of an oscillation signal in a frequency range same as that of another oscillation circuit among the oscillation circuits disposed on the opposing side of the lens barrel.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

An aspect of the present disclosure provides an actuator of a camera module capable of precisely detecting a position of a magnet without using a hall sensor.

Figure 1:
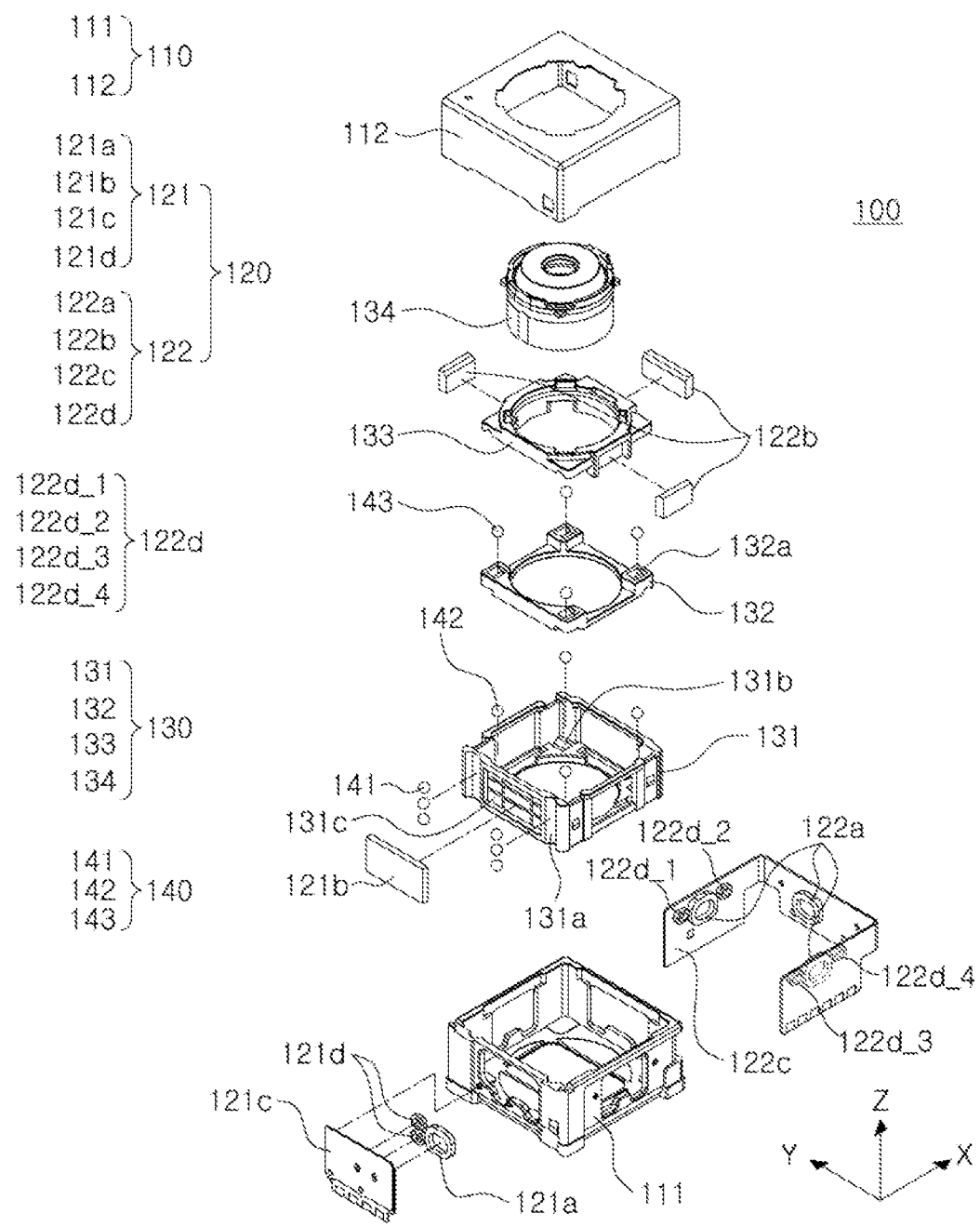
FIG. 1 is an exploded perspective view illustrating an example of a camera module.

FIG. 1 is an exploded perspective view illustrating an example of a camera module.

Referring to FIG. 1, a camera module 100 includes a housing unit 110, an actuator 120, and a lens module 130, and further includes a ball bearing portion 140.

The camera module 100 can perform one or more of an autofocusing function and an optical image stabilization function. As an example, for the camera module 100 to perform the autofocusing function and the optical image stabilization function, the lens module 130 can move in an optical axis direction and directions perpendicular to the optical axis in the housing unit 110.

The housing unit 110 includes a housing 111 and a shield case 112. The housing 111 is formed of a material that is easily molded. For example, the housing 111 is formed of plastic. One or more actuator 120 is mounted in the housing 111. As an example, some of components of a first actuator 121 are mounted on a first side surface of the housing 111, and some of components of a second actuator 122 are mounted on second, third, and fourth side surfaces of the housing 111. The housing 111 is configured to accommodate the lens module 130 therein. As an example, a space in which the lens module 130 is completely or partially accommodated is formed in the housing 111.

Six surfaces of the housing 111 are open. As an example, a hole for an image sensor is formed in a bottom surface of the housing 111, and a rectangular hole for mounting the lens module 130 is formed in a top surface of the housing 111. In addition, the first side surface of the housing 111 is open so that a first driving coil 121a of the first actuator 121 can be inserted thereinto, and the second, third, and fourth side surfaces of the housing 111 are open so that second diving coils 122a of the second actuator 122 can be inserted thereinto.

The shield case 112 is configured to cover portions of the housing 111. As an example, the shield case 112 is configured to cover the top surface and four side surfaces of the housing 111. Alternatively, the shield case 112 may be configured to cover only the four side surfaces of the housing 111 or may be configured to partially cover the top surface and the four side surfaces of the housing 111. The shield case 112 may block electromagnetic waves generated during driving of the camera module. The electromagnetic waves may be generated at the time of driving the camera module, and when the electromagnetic waves are emitted externally of the camera module, the electromagnetic waves may affect other electronic components to cause communications errors or malfunctions. In order to prevent such a problem, the shield case 112 is formed of a metal and is grounded to a ground pad of a substrate mounted on the bottom surface of the housing 111 to block the electromagnetic waves. Meanwhile, when the shield case 112 is formed of a plastic injection-molded product, a conductive paint may be applied to an inner surface of the shield case 112 or a conductive film or a conductive tape may be attached to the inner surface of the shield case 112 to block the electromagnetic waves. In this case, the conductive paint may be conductive epoxy, but is not limited thereto. That is, various materials having conductivity may be used as the conductive paint.

The number of actuators 120 may be more than one. As an example, the actuators 120 include the first actuator 121 configured to move the lens module 130 in a Z-axis direction and the second actuator 122 configured to move the lens module 130 in an X-axis direction and a Y-axis direction.

The first actuator 121 is mounted on the housing 111 and a first frame 131 of the lens module 130. As an example, some of the components of the first actuator 121 are mounted on the first side surface of the housing 111, and other components of the first actuator 121 are mounted on a first side surface of the first frame 131. The first actuator 121 is configured to move the lens module 130 in the optical axis direction (the Z-axis direction). As an example, the first actuator 121 includes the first driving coil 121a, a first magnet 121b, a first substrate 121c, and one or more autofocusing (AF) sensing coil 121d. The first driving coil 121a and the AF sensing coil 121d are formed on the first substrate 121c. The first substrate 121c is mounted on the first side surface of the housing 111, and the first magnet 121b is mounted on the first side surface 131c of the first frame 131 facing the first substrate 121c.

A first driving device (not illustrated) to provide a driving signal to the first driving coil 121a is provided on the first substrate 121c. The first driving device applies the driving signal to the first driving coil 121a to provide driving force to the first magnet 121b. The first driving device includes a driver integrated circuit (IC) to provide the driving signal to the first driving coil 121a. When the driving signal is applied from the first driving device to the first driving coil 121a, a magnetic flux is generated by the first driving coil 121a, and interacts with a magnetic field of the first magnet 121b to generate driving force enabling relative movement of the first frame 131 and a lens barrel 134 with respect to the housing 111, depending on Fleming's left-hand rule. The first driving device may include an H-bridge circuit that may be bidirectionally driven to apply the driving signal to the first driving coil 121a.

The lens barrel 134 moves in the same direction as a moving direction of the first frame 131 by movement of the first frame 131. The first actuator 121 can sense strength of the magnetic field of the first magnet 121b by the AF sensing coil 121d to detect positions of the first frame 131 and the lens barrel 134.

The AF sensing coil 121d is disposed outside of the first driving coil 121a, and includes one or more coil. An inductance of the AF sensing coil 121d is changed in response to a displacement of the first magnet 121b. When the first magnet 121b moves in one direction, the strength of the magnetic field of the first magnet 121b having an influence on the AF sensing coil 121d is changed, and the inductance of the AF sensing coil 121d is thus changed. The first actuator 121 can determine displacements of the lens barrel 134 and the first frame 131 from the change in the inductance of the one or more AF sensing coil 121d. As an example, the first actuator 121 further includes one or more capacitor, and the one or more capacitor and the AF sensing coil 121d may form a predetermined oscillation circuit. As an example, the number of capacitors included in the first actuator 121 corresponds to that of AF sensing coils 121d, and one capacitor and one AF sensing coil 121d are configured in a form such as a predetermined LC oscillator or in a form such as any well-known Colpitts oscillator.

The first actuator 121 determines the displacement of the lens barrel 134 from a change in a frequency of an oscillation signal generated by the oscillation circuit. In detail, when the inductance of the AF sensing coil 121d forming the oscillation circuit is changed, the frequency of the oscillation signal generated by the oscillation circuit is changed, and the displacement of the lens barrel 134 is thus detected on the basis of the change in the frequency.

The second actuator 122 is mounted on the housing 111 and a third frame 133 of the lens module 130. As an example, some of the components of the second actuator 122 are mounted on the second to fourth side surfaces of the housing 111, and other components of the second actuator 122 are mounted on second to fourth side surfaces of the third frame 133. Meanwhile, according to another example, the second actuator 122 is mounted on some of the second, third, and fourth side surfaces of the housing 111 and the third frame 133, is mounted on some of the corners at which the second, third, and fourth side surfaces of the housing 111 are in contact with each other and corners at which the second, third, and fourth side surfaces of the third frame 133 are in contact with each other, or is mounted on some of the corners at which the second, third, and fourth side surfaces of the housing 111 are in contact with each other.

The second actuator 122 can move the lens module 130 in the directions perpendicular to the optical axis. As an example, the second actuator 122 includes second driving coils 122a, second magnets 122b, a second substrate 122c, and optical image stabilization (OIS) sensing coils 122d (122d_1, 122d_2, 122d_3, and 122d_4).

The second driving coils 122a and the OIS sensing coils 122d_1, 122d_2, 122d_3, and 122d_4 are disposed on the second substrate 122c. As an example, the number of second driving coils 122a is three, and the three second driving coils 122a are disposed on second, third, and fourth side surfaces of the second substrate 122c, respectively. In addition, the number of OIS sensing coils 122d_1, 122d_2, 122d_3, and 122d_4 are four, and two OIS sensing coils 122d_1 and 122d_2 are disposed on the second side surface of the second substrate 122c in the X-axis direction, and the other two OIS sensing coils 122d_3 and 122d_4 are disposed on the fourth side surface of the second substrate 122c in the X-axis direction. Here, a second driving coil 122a is disposed between the two OIS sensing coils 122d_1 and 122d_2, and another second driving coil 122a is disposed between the two OIS sensing coils 122d_3 and 122d_4.

The second substrate 122c has a generally rectangular shape of which one side is open, and is mounted to surround the second, third, and fourth side surfaces of the housing 111. The second magnets 122b are mounted on the second, third, and fourth side surfaces of the third frame 133, respectively, to face the second substrate 122c.

A second driving device (for example, driving device 210 described later with reference to FIG. 2) to provide driving signals to the second driving coils 122a is provided on the second substrate 122c. The second driving device applies the driving signals to the second driving coils 122a to provide driving force to the second magnets 122b. The second driving device includes a driver IC to provide the driving signals to the second driving coils 122a. For example, when the driving signals are provided from the second driving device to the second driving coils 122a, magnetic fluxes are generated by the second driving coils 122a, and interact with magnetic fields of the second magnets 122b. The second driving device can change a magnitude and a direction of magnetic force generated between the second driving coils 122a and the second magnets 122b to enable relative movement of a second frame 132 and/or the third frame 133 with respect to the first frame 131. The second driving device may include an H-bridge circuit that may be bidirectionally driven to apply the driving signals to the second driving coils 122a.

The lens barrel 134 moves in the same direction as a moving direction of the second frame 132 or the third frame 133 by the respective movement of the second frame 132 or the third frame 133. The second actuator 122 senses strength of the magnetic fields of the second magnets 122b with the OIS sensing coils 122d_1, 122d_2, 122d_3, and 122d_4 to detect positions of the lens barrel 134 and the second or third frame 132 or 133. The second actuator 122 detects the position of the second frame 132 or the third frame 133 from changes in inductances of the OIS sensing coils 122d_1, 122d_2, 122d_3, and 122d_4.

The lens module 130 is mounted in the housing unit 110. As an example, the lens module 130 is accommodated in an accommodation space formed by the housing 111 and the shield case 112 to be movable in at least three axis directions. The lens module 130 includes two or more frames. As an example, the lens module 130 includes the first frame 131, the second frame 132, and the third frame 133.

The first frame 131 is configured to be movable with respect to the housing 111. As an example, the first frame 131 moves in the optical axis direction (the Z-axis direction) of the housing 111 by the first actuator 121 described above. Guide grooves 131a and 131b are formed in the first frame 131. As an example, one or more first guide grooves 131a extended to be elongated in the optical axis direction (the Z-axis direction) are formed in the first side surface of the first frame 131, and second guide grooves 131b extended to be elongated in a first direction (the Y-axis direction) perpendicular to the optical axis are formed in four corners of an inner bottom surface of the first frame 131, respectively. The first frame 131 is manufactured so that at least three side surfaces thereof are open. As an example, second, third, and fourth side surfaces of the first frame 131 are open so that the second magnets 122b mounted on the third frame 133 and the second driving coils 122a mounted on the second substrate 122c disposed on the housing 111 may face each other.

The second frame 132 is mounted in the first frame 131. As an example, the second frame 132 is mounted in an internal space of the first frame 131. The second frame 132 is configured to move in the first direction (the Y-axis direction) perpendicular to the optical axis with respect to the first frame 131. As an example, the second frame 132 moves in the first direction, perpendicular to the optical axis along the second guide grooves 131b of the first frame 131.

Guide grooves 132a are formed in the second frame 132. As an example, four third guide grooves 132a extended to be elongated in a second direction (the X-axis direction) perpendicular to the optical axis are formed in corners of the second frame 132, respectively. The third frame 133 is mounted on the second frame 132. The third frame 133 is mounted on an upper surface of the second frame 132. The third frame 133 is configured to move in the second direction, perpendicular to the optical axis with respect to the second frame 132. As an example, the third frame 133 moves in the second direction, perpendicular to the optical axis along the third guide grooves 132a of the second frame 132. The second magnets 122b are mounted on the third frame 133. As an example, at least two second magnets 122b are mounted on the second, third, and fourth side surfaces of the third frame 133, respectively. Alternatively, as an example, three second magnets 122b are mounted on the second, third, and fourth side surfaces of the third frame 133, respectively. Meanwhile, according to another example, the third frame 133 described above is formed integrally with the second frame 132. In this case, the third frame 133 is omitted, and the second frame 132 moves in the first direction and the second direction, perpendicular to the optical axis.

The lens module 130 includes the lens barrel 134. As an example, the lens module 130 includes the lens barrel 134 including one or more lens. The lens barrel 134 has a hollow cylindrical shape so that one or more lens, configured to capture an image of a subject, may be accommodated therein, and the one or more lens can be provided in the lens barrel 134 along the optical axis. The number of lenses stacked in the lens barrel 134 depends on a predetermined design of the lens barrel 134, and these lenses have optical characteristics such as the same refractive index, or different refractive indices, refractive power, and the like.

The lens barrel 134 is mounted in the third frame 133. As an example, the lens barrel 134 is fitted into the third frame 133 to thus move integrally with the third frame 133. The lens barrel 134 is configured to move in the optical axis direction (the Z-axis direction) and directions (the X-axis and Y-axis directions) perpendicular to the optical axis. As an example, the lens barrel 134 moves in the optical axis direction (the Z-axis direction) by the first actuator 121, and moves in the directions (the X-axis and Y-axis directions) perpendicular to the optical axis by the second actuator 122.

The ball bearing portion 140 guides the movement of the lens module 130. As an example, the ball bearing portion 140 is configured so that the lens module 130 smoothly moves in the optical axis direction and the directions perpendicular to the optical axis. The ball bearing portion 140 includes first ball bearings 141, second ball bearings 142, and third ball bearings 143. As an example, the first ball bearings 141 are disposed in the first guide groove 131a of the first frame 131 to allow the first frame 131 to move smoothly in the optical axis direction. As another example, the second ball bearings 142 are disposed in the second guide grooves 131b of the first frame 131 to allow the second frame 132 to move smoothly in the first direction, perpendicular to the optical axis. As another example, the third ball bearings 143 are disposed in the third guide grooves 132a of the second frame 132 to allow the third frame 133 to move smoothly in the second direction, perpendicular to the optical axis.

Each of the first and second ball bearings 141 and 142 includes three or more bearings, and the three or more bearings of each of the first and second ball bearings 141 and 142 are disposed in the first or second guide grooves 131*a* or 131*b*, respectively.

A lubricating material for reducing friction and noise may be filled in all portions in which the ball bearing portion 140 is disposed. As an example, a viscous fluid is injected into the respective guide grooves 131*a*, 131*b*, and 132*a*. As the viscous fluid, grease having excellent viscosity and lubricating characteristics may be used.

Figure 2:
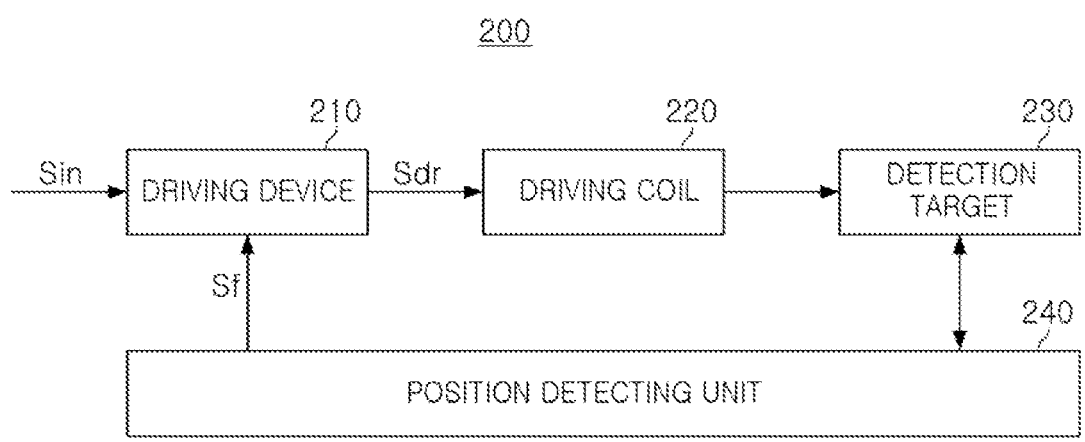
FIG. 2 is a block diagram illustrating example main units of an actuator used in the camera module of FIG. 1.

FIG. 2 is a block diagram illustrating example main units of an actuator used in the camera module of FIG. 1. An actuator 200 according to the example of FIG. 2 may correspond to the example second actuator 122 of FIG. 1.

When the actuator 200 of FIG. 2 corresponds to the second actuator 122 of FIG. 1, the actuator 200 moves the lens barrel 134 in the directions perpendicular to the optical axis to perform an OIS function of the camera module 100. Therefore, when the actuator 200 of FIG. 2 performs the optical image stabilization function, a driving device 210 applies a driving signal to a driving coil 220 to provide driving force in the directions perpendicular to the optical axis to a magnet. In an example, the driving coil 220 is the second driving coil 122*a* and the magnet is the second magnet 122*b* of FIG. 1.

The example actuator 200 disclosed herein includes the driving device 210, the driving coil 220, a detection target 230, and a position detecting unit 240.

The driving device 210 generates a driving signal Sdr in response to an input signal Sin applied from an external source and a feedback signal Sf generated by the position detecting unit 240, and provides the generated driving signal Sdr to the driving coil 220. When the driving signal Sdr is applied to the driving coil 220 from the driving device 210, the lens barrel moves in the directions perpendicular to the optical axis by electromagnetic interaction between the driving coil 220 and the magnet.

The position detecting unit 240 calculates a position of the lens barrel moving by the electromagnetic interaction between the magnet and the driving coil 220 through the detection target 230 to generate the feedback signal Sf, and provide the feedback signal Sf to the driving device 210. The detection target 230 is provided at one side of the lens barrel to move in the same direction as a moving direction of the lens barrel. As an example, the detection target 230 is provided on each of a surface and another surface of the lens barrel to face sensing coils of the position detecting unit 240. According to another example, the detection target 230 is provided on frames coupled to the lens barrel, in addition to the lens barrel. Here, the surface and the other surface of the lens barrel refer to surfaces opposing each other in relation to the optical axis of the lens barrel. For example, the surface and the other surface are disposed on opposite sides of the cylindrical lens barrel 134 of FIG. 1, for example, 180° from each other.

The detection target 230 is formed of one of a magnetic material and a conductor. As an example, the detection target 230 corresponds to the second magnets 122*b* included in the second actuator 122 of FIG. 1. However, according to another example, the detection target 230 is configured using a separate element, in addition to the second magnets 122*b*.

The position detecting unit 240 includes sensing coils, and calculates a position of the lens barrel in response to inductances of the sensing coils. When the detection target 230 provided on the side of the lens barrel moves, areas of the detection target 230 overlapping the sensing coils or distances between the sensing coils and the detection target are changed, and the position detecting unit 240 thus calculates positions of the lens barrel in the X-axis and Y-axis directions in response to inductances of the sensing coils changed in response to the movement of the detection target 230. In this case, the sensing coils included in the position detecting unit 240 may correspond to the OIS sensing coils 122*d*_1, 122*d*_2, 122*d*_3, and 122*d*_4 included in the second actuator 122 of FIG. 1.

Figure 3:
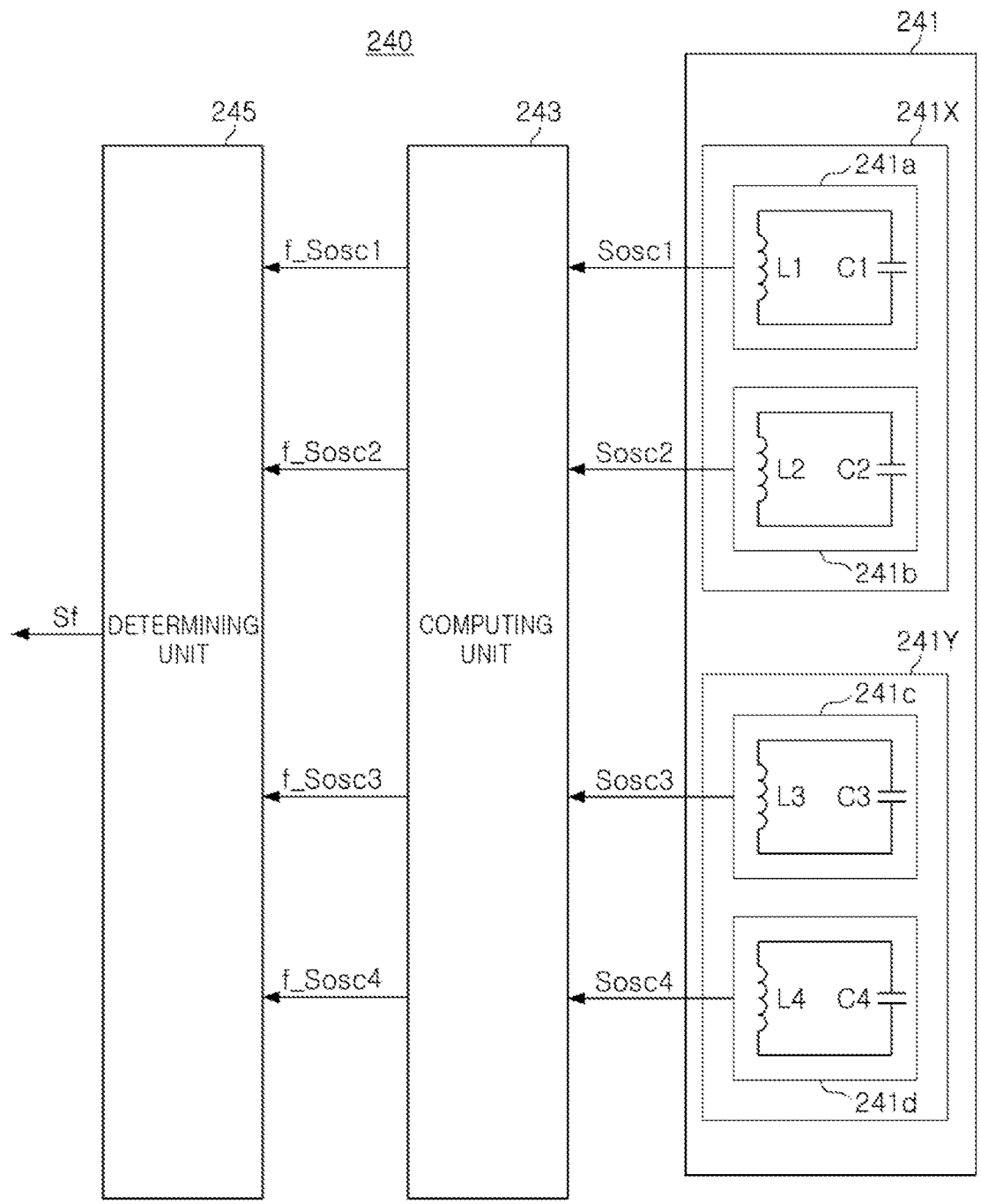
FIG. 3 is a block diagram illustrating an example of a position detecting unit of an actuator used in the camera module of FIG. 1.

FIG. 3 is a block diagram illustrating an example of a position detecting unit of an actuator used in the camera module of FIG. 1. An operation of calculating the position of the lens barrel by the position detecting unit 240 will hereinafter be described with reference to FIGS. 1 through 3.

The position detecting unit 240 according to the example includes an oscillating unit 241, a computing unit 243, and a determining unit 245.

The oscillation unit 241 includes a first oscillation circuit unit 241X and a second oscillation circuit unit 241Y to generate oscillation signals Sosc. Each of the first oscillation circuit unit 241X and the second oscillation circuit unit 241Y include two or more oscillation circuits. The first oscillation circuit unit 241X is disposed to face the surface of the lens barrel, and the second oscillation circuit unit 241Y is disposed to face the other surface of the lens barrel.

The first oscillation circuit unit 241X includes a first oscillation circuit 241*a* and a second oscillation circuit 241*b*, and the second oscillation circuit unit 241Y includes a third oscillation circuit 241*c* and a fourth oscillation circuit 241*d*.

Each of the first oscillation circuit 241*a*, the second oscillation circuit 241*b*, the third oscillation circuit 241*c*, and the fourth oscillation circuit 241*d* include a sensing coil and a capacitor to constitute a predetermined LC oscillator. For example, the first oscillation circuit 241*a* includes a first sensing coil L1 and a first capacitor C1, the second oscillation circuit 241*b* includes a second sensing coil L2 and a second capacitor C2, the third oscillation circuit 241*c* includes a third sensing coil L3 and a third capacitor C3, and the fourth oscillation circuit 241*d* includes a fourth sensing coil L4 and a fourth capacitor C4.

The first sensing coil L1, the second sensing coil L2, the third sensing coil L3, and the fourth sensing coil L4 included in the first oscillation circuit 241*a*, the second oscillation circuit 241*b*, the third oscillation circuit 241*c*, and the fourth oscillation circuit 241*d*, respectively, correspond to the OIS sensing coils 122*d*_1, 12*d*_2, 122*d*_3, and 122*d*_4 included in the second actuator 122 of FIG. 1. As an example, the first sensing coil L1 and the second sensing coil L2 correspond to the two OIS sensing coils 122*d*_1 and 122*d*_2 disposed on the second side surface of the second substrate 122*c*, and the third sensing coil L3 and the fourth sensing coil L4 correspond to the other two OIS sensing coils 122*d*_3 and 122*d*_4 disposed on the fourth side surface of the second substrate 122*c*.

The first sensing coil L1 and the second sensing coil L2 are disposed in one direction (the X-axis direction of FIG. 1) to face the surface of the lens barrel and the third sensing coil L3 and the fourth sensing coil L4 are disposed in one direction (the X-axis direction of FIG. 1) to face the other surface of the lens barrel opposing the surface of the lens barrel. For example, the surface and the other surface are disposed on opposite sides of the cylindrical lens barrel, for example, 180° from each other. Here, the first sensing coil L1 and the third sensing coil L3 are disposed at one side in the X-axis direction, and the second sensing coil L2 and the fourth sensing coil L4 are disposed at the other side in the X-axis direction. Here, the first sensing coil L1 and the second sensing coil L2 may be provided to be symmetrical to each other in relation to a plane formed by an optical axis of a neutral position of the lens barrel and an X axis of the neutral position of the lens barrel. Here, the neutral position refers to an initially set position when driving force is not provided to the magnet.

The first oscillation circuit 241a, the second oscillation circuit 241b, the third oscillation circuit 241c, and the fourth oscillation circuit 241d of FIG. 3, which are schematically illustrated, may be configured in a form of various types of well-known oscillators.

Frequencies of the oscillation signals Sosc1, Sosc2, Sosc3, Sosc4 of the first oscillation circuit 241a, the second oscillation circuit 241b, the third oscillation circuit 241c, and the fourth oscillation circuit 241d are determined by inductances of the first sensing coil L1, the second sensing coil L2, the third sensing coil L3, and the fourth sensing coil L4, respectively. When the oscillation circuit is implemented by the LC oscillator including the sensing coil and the capacitor, the frequency "f" of the oscillation signal Sosc1, Sosc2, Sosc3, or Sosc4 is represented by Equation 1. In Equation 1, "l" indicates inductance of the first sensing coil L1, the second sensing coil L2, the third sensing coil L3, or the fourth sensing coil L4, and c indicates corresponding capacitance of the first capacitor C1, the second capacitor C2, the third capacitor C3, or the fourth capacitor C4. Here, intrinsic inductances of the first sensing coil L1, the second sensing coil L2, the third sensing coil L3, and the fourth sensing coil L4 may be substantially the same as each other.

$$f = \frac{1}{2\pi\sqrt{lc}} \qquad \text{Equation 1}$$

When the lens barrel moves, strength of a magnetic field of the detection target 230 having an influence on the inductances of the first sensing coil L1, the second sensing coil L2, the third sensing coil L3, and the fourth sensing coil L4 of the oscillating unit 241 is changed, and the inductances of the first sensing coil L1, the second sensing coil L2, the third sensing coil L3, and the fourth sensing coil L4 are thus changed. Therefore, frequencies of a first oscillation signal Sosc1, a second oscillation signal Sosc2, a third oscillation signal Sosc3, and a fourth oscillation signal Sosc4 output from the first oscillation circuit 241a, the second oscillation circuit 241b, the third oscillation circuit 241c, and the fourth oscillation circuit 241d are changed in response to movement of the detection target 230. According to an example, a magnetic material having a high magnetic permeability may be disposed between the detection target 230 and the oscillating unit 241 in order to increase change ratios in the inductances of the first sensing coil L1, the second sensing coil L2, the third sensing coil L3, and the fourth sensing coil L4 in response to the movement of the detection target 230.

In the examples disclosed herein, capacitances of some of the first capacitor C1, the second capacitor C2, the third capacitor C3, and the fourth capacitor C4 included in the first oscillation circuit 241a, the second oscillation circuit 241b, the third oscillation circuit 241c, and the fourth oscillation circuit 241d, respectively, may be different from each other. The capacitances of the first capacitor C1, the second capacitor C2, the third capacitor C3, and the fourth capacitor C4 determine frequency ranges of the oscillation signals.

Capacitances of two capacitors facing any one of the surface and the other surface of the lens barrel are different from each other, a capacitance of any one of two capacitors facing the surface of the lens barrel is the same as that of any one of two capacitors facing the other surface of the lens barrel, and a capacitance of the other of the two capacitors facing the surface of the lens barrel is the same as that of the other of two capacitors facing the other surface of the lens barrel.

As an example, capacitances of the first capacitor C1 and the fourth capacitor C4 are different from those of the second capacitor C2 and the third capacitor C3. Here, the capacitances of the first capacitor C1 and the fourth capacitor C4 are the same as each other, and the capacitances of the second capacitor C2 and the third capacitor C3 are the same as each other. As an example, the first capacitor C1 and the fourth capacitor C4 have relatively high capacitance, and the second capacitor C2 and the third capacitor C3 have relatively low capacitance.

Therefore, frequency ranges of some of the first oscillation signal Sosc1, the second oscillation signal Sosc2, the third oscillation signal Sosc3, and the fourth oscillation signal Sosc4 generated by the first oscillation circuit 241a, the second oscillation circuit 241b, the third oscillation circuit 241c, and the fourth oscillation circuit 241d may be different from each other. As an example, frequency ranges of the first oscillation signal Sosc1 and the fourth oscillation signal Sosc4 are different from those of the second oscillation signal Sosc2 and the third oscillation signal Sosc3. Here, the frequency ranges of the first oscillation signal Sosc1 and the fourth oscillation signal Sosc4 are the same as each other, and the frequency ranges of the second oscillation signal Sosc2 and the third oscillation signal Sosc3 are the same as each other.

As an example, the frequency ranges of the first oscillation signal Sosc1 and the fourth oscillation signal Sosc4 correspond to a low frequency region, and the frequency ranges of the second oscillation signal Sosc2 and the third oscillation signal Sosc3 correspond to a high frequency region. Here, the low frequency region is a frequency region of about 50 KHz to about 200 KHz, and the high frequency region is a frequency region of about 350 KHz to about 1 MHz.

In the examples disclosed herein, two oscillation circuits disposed to face the surface or the other surface of the lens barrel and to be adjacent to each other can generate oscillation signals in different frequency ranges to prevent interference between oscillation signals.

The computing unit 243 computes frequencies f_Sosc1, f_Sosc2, f_Sosc3, and f_Sosc4 of the first oscillation signal Sosc1, the second oscillation signal Sosc2, the third oscillation signal Sosc3, and the fourth oscillation signal Sosc4 generated by the first oscillation circuit 241a, the second oscillation circuit 241b, the third oscillation circuit 241c, and the fourth oscillation circuit 241d. As an example, the computing unit 243 computes the frequencies f_Sosc1, f_Sosc2, f_Sosc3, and f_Sosc4 of the first oscillation signal Sosc1, the second oscillation signal Sosc2, the third oscillation signal Sosc3, and the fourth oscillation signal Sosc4 using reference clocks CLK. For example, the computing unit 243 counts the oscillation signals using the reference clocks CLK, and computes the frequencies using the number of counted reference clocks CLK and frequencies of the reference clocks CLK. As an example, the computing unit 243 counts oscillation signals during a reference section as the reference clocks CLK.

The determining unit 245 receives the frequencies f_Sosc1, f_Sosc2, f_Sosc3, and f_Sosc4 of the first oscillation signal Sosc1, the second oscillation signal Sosc2, the third oscillation signal Sosc3, and the fourth oscillation signal Sosc4 from the computing unit 243, and determines positions of the lens barrel in the X-axis and Y-axis directions in response to the frequencies f_Sosc1, f_Sosc2, f_Sosc3, and f_Sosc4.

The determining unit 245 determines the position of the lens barrel in the X-axis direction, P(X), by summing a difference between the first frequency _Sosc1 and the second frequency f_Sosc2 and a difference between the third frequency f_Sosc3 and the fourth frequency f_Sosc4 as represented by the following Equation 2.

$$P(X)=(f\_Sosc1-f\_Sosc2)+(f\_Sosc3-f\_Sosc4) \quad \text{Equation 2}$$

In FIG. 1, when the lens barrel moves along an X axis, directions of changes in the inductances of the first sensing coil L1 and the third sensing coil L3 and changes in the inductances of the second sensing coil L2 and the fourth sensing coil L4 are different from each other. When the lens barrel moves in one direction of the X axis, in a case in which the inductances of the first sensing coil L1 and the third sensing coil L3 are increased, the inductances of the second sensing coil L2 and the fourth sensing coil L4 are decreased.

Therefore, the position of the lens barrel in the X-axis direction is calculated from each of the difference between the first frequency _Sosc1 and the second frequency f_Sosc2 and the difference between the third frequency f_Sosc3 and the fourth frequency f_Sosc4.

In the present example, the position of the lens barrel in the X-axis direction is determined by summing the difference between the first frequency _Sosc1 and the second frequency f_Sosc2 and the difference between the third frequency f_Sosc3 and the fourth frequency f_Sosc4 rather than performing subtraction between the first frequency _Sosc1 and the second frequency f_Sosc2 or subtraction between the third frequency f_Sosc3 and the fourth frequency f_Sosc4, such that inductance values of the sensing coils in response to movement of the lens barrel in the Y-axis direction are compensated for.

The determining unit 245 determines the position of the lens barrel in the Y-axis direction, P(Y), by summing a difference between the first frequency _Sosc1 and the third frequency f_Sosc3 and a difference between the second frequency f_Sosc2 and the fourth frequency f_Sosc4 as represented by the following Equation 3.

$$P(Y)=(f\_Sosc1-f\_Sosc3)+(f\_Sosc2-f\_Sosc4) \quad \text{Equation 3}$$

In FIG. 1, when the lens barrel moves along a Y axis, directions of changes in the inductances of the first sensing coil L1 and the second sensing coil L2 and changes in the inductances of the third sensing coil L3 and the fourth sensing coil L4 are different from each other. When the lens barrel moves in one direction of the Y axis, in a case in which the inductances of the first sensing coil L1 and the second sensing coil L2 are increased, the inductances of the third sensing coil L3 and the fourth sensing coil L4 are decreased.

Therefore, the position of the lens barrel in the Y-axis direction is calculated from each of the difference between the first frequency _Sosc1 and the third frequency f_Sosc3 and the difference between the second frequency f_Sosc2 and the fourth frequency f_Sosc4.

In the present example, the position of the lens barrel in the Y-axis direction is determined by summing the difference between the first frequency _Sosc1 and the third frequency f_Sosc3 and the difference between the second frequency f_Sosc2 and the fourth frequency f_Sosc4 rather than performing subtraction between the first frequency _Sosc1 and the third frequency f_Sosc3 or subtraction between the second frequency f_Sosc2 and the fourth frequency f_Sosc4, such that inductance values of the sensing coils in response to movement of the lens barrel in the X-axis direction are compensated for.

Since the frequencies of the oscillation circuits are changed by parasitic inductance and parasitic capacitance as well as the inductances of the sensing coils and the capacitances of the capacitors, parasitic inductance and parasitic capacitance components may need to be removed.

Since the parasitic inductance component is in proportion to magnitudes of the inductances of the sensing coils, when a frequency of an oscillation signal output from any one oscillation circuit is divided by a frequency of an oscillation signal output from another oscillation circuit, the parasitic inductance component can be removed.

As described above, in order to prevent the interference between the oscillation signals output from the two oscillation circuits disposed to face the surface or the other surface of the lens barrel and be adjacent to each other, the capacitances of some of the first capacitor C1, the second capacitor C2, the third capacitor C3, and the fourth capacitor C4 are different from each other. Therefore, when the frequency of the oscillation signal output from any one oscillation circuit is divided by the frequency of the oscillation signal output from another oscillation circuit, the parasitic capacitance component may not be removed.

In the present example, the positions of the lens barrel in the X-axis direction and the Y-axis direction are determined by dividing a frequency of an oscillation signal output from any one of the oscillation circuits by a frequency of an oscillation signal output from another oscillation circuit in the same frequency range as that of the frequency of the oscillation signal output from the any one oscillation circuit and then computing the above Equations 1 and 2.

As an example, when the capacitances of the first capacitor C1 and the fourth capacitor C4 are the same as each other and the capacitances of the second capacitor C2 and the third capacitor C3 are the same as each other, when the frequency of the oscillation signal output from any one of the oscillation circuits is divided by the frequency of the oscillation signal output from another oscillation circuit in the same frequency range as that of the frequency of the oscillation signal output from the any one oscillation circuit, the above Equations 2 and 3 may be represented by Equations 4 and 5, respectively.

$$P'(X) = \left(\frac{f\_Sosc1}{f\_Sosc4} - \frac{f\_Sosc2}{f\_Socs3}\right) + \left(\frac{f\_Sosc3}{f\_Sosc4} - \frac{f\_Sosc4}{f\_Sosc1}\right) \quad \text{Equation 4}$$

$$P'(Y) = \left(\frac{f\_Sosc1}{f\_Sosc4} - \frac{f\_Sosc3}{f\_Socs2}\right) + \left(\frac{f\_Sosc2}{f\_Sosc3} - \frac{f\_Sosc4}{f\_Sosc1}\right) \quad \text{Equation 5}$$

Therefore, in the examples disclosed herein, the position of the lens barrel P'(X), P'(Y) is calculated depending on a ratio between the frequencies of the oscillation signals having the same frequency range. Therefore, the actuator of a camera according to the examples disclosed herein precisely measures the frequencies of the oscillation signals by removing parasitic components while preventing interference between oscillation signals output from the two oscillation circuits disposed to face the surface or the other surface of the lens barrel and be adjacent to each other.

The determining unit 245 includes a memory, and position information of the lens barrel corresponding to the frequency f_Sosc of the oscillation signal Sosc can be stored in the memory. The memory may be implemented by a nonvolatile memory including one or more of a flash memory, an electrically erasable programmable read-only memory (EEPROM), and a ferroelectric random-access memory (FeRAM). The determining unit 245 determines the position of the lens barrel by comparing a computing result depending on Equations 1 to 4 with the position information of the lens barrel stored in the memory.

As set forth above, the actuator of a camera module in the examples disclosed herein precisely detects the position of the lens barrel from the changes in the inductances of the sensing coils. Further, the actuator of a camera module does not use a separate hall sensor, such that a manufacturing cost of the actuator of a camera module is reduced and space efficiency of the actuator of a camera module is improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator, comprising:
   two or more detection targets disposed on a first surface and a second surface of a lens barrel, respectively;
   an oscillating unit comprising a first oscillation circuit unit comprising two or more oscillation circuits disposed to face the first surface, and a second oscillation circuit unit comprising two or more oscillation circuits disposed to face the second surface, and configured to output oscillation signals; and
   a determining unit configured to calculate a position of the lens barrel from the oscillation signals output from the oscillating unit,
   wherein a frequency range of an oscillation signal output from any one of the two or more oscillation circuits of the first oscillation circuit unit is different from a frequency range of an oscillation signal output from any one of the two or more oscillation circuits of the second oscillation circuit unit,
   wherein each of the two or more oscillation circuits of the first oscillation circuit unit, and the two or more oscillation circuits of the second oscillation circuit unit comprise a sensing coil and a capacitor, and
   wherein an inductance of the sensing coil included in each of the first oscillation circuit unit and the second oscillation circuit unit is changed in response to movement of the lens barrel.

2. The actuator of claim 1, wherein a frequency range of an oscillation signal output from any one of the two or more oscillation circuits of any one of the first oscillation circuit unit and the second oscillation circuit unit is different from a frequency range of an oscillation signal output from another of the two or more oscillation circuits.

3. The actuator of claim 1, wherein the frequency range of the oscillation signal output from the one of the two or more oscillation circuits of the first oscillation circuit unit is the same as the frequency range of an oscillation signal output from another of the two or more oscillation circuits of the second oscillation circuit unit.

4. The actuator of claim 1, wherein the first surface and the second surface of the lens barrel oppose each other in relation to an optical axis of the lens barrel.

5. The actuator of claim 1, wherein the sensing coils of the two or more oscillation circuits of the first oscillation circuit unit are disposed in a direction perpendicular to an optical axis of the lens barrel, and
   wherein the sensing coils of the two or more oscillation circuits of the second oscillation circuit unit are disposed in the direction perpendicular to the optical axis of the lens barrel.

6. The actuator of claim 1, wherein the frequency range of the oscillation signal output is determined depending on a capacitance of the capacitor.

7. An actuator, comprising:
   two or more detection targets disposed on a first surface and a second surface of a lens barrel, respectively;
   an oscillating unit comprising a first oscillation circuit unit comprising two or more oscillation circuits disposed to face the first surface and configured to output oscillation signals comprising different frequency ranges, and a second oscillation circuit unit comprising two or more oscillation circuits disposed to face the second surface and configured to output oscillation signals comprising different frequency ranges;
   a computing unit configured to compute frequencies of the oscillation signals output from the oscillating unit; and
   a determining unit configured to calculate a position of the lens barrel from the frequencies of the oscillation signals,
   wherein a frequency range of an oscillation signal output from any one of the two or more oscillation circuits of the first oscillation circuit unit is the same as a frequency range of an oscillation signal output from any one of the two or more oscillation circuits of the second oscillation circuit unit,
   wherein each of the two or more oscillation circuits of the first oscillation circuit unit and the two or more oscillation circuits of the second oscillation circuit unit comprises a sensing coil and a capacitor, and
   wherein an inductance of the sensing coil included in each of the first oscillation circuit unit and the second oscillation circuit unit is changed in response to movement of the lens barrel.

8. The actuator of claim 7, wherein the determining unit is configured to calculate the position of the lens barrel depending on a ratio between frequencies of oscillation signals output from oscillation circuits of each of the first oscillation circuit unit and the second oscillation circuit unit, having the same frequency range.

9. The actuator of claim 7, wherein the two or more oscillation circuits of the first oscillation circuit unit are disposed in a first direction perpendicular to an optical axis, and the two or more oscillation circuits of the second oscillation circuit unit are disposed in the first direction.

10. The actuator of claim 9, wherein the determining unit is configured to calculate a position of the lens barrel in the first direction by summing a difference between the oscillation signals output from the two or more oscillation circuits of the first oscillation circuit unit and a difference between the oscillation signals output from the two or more oscillation circuits of the second oscillation circuit unit.

11. The actuator of claim 9, wherein the determining unit is configured to calculate a position of the lens barrel in a second direction by summing a difference between oscillation signals output from two or more oscillation circuits disposed at one side in the first direction among the two or more oscillation circuits of each of the first oscillation circuit unit and the second oscillation circuit unit and a difference between oscillation signals output from two or more oscillation circuits disposed at the other side in the first direction among the two or more oscillation circuits of each of the first oscillation circuit unit and the second oscillation circuit unit, the second direction being different from the first direction and perpendicular to the optical axis.

12. The actuator of claim 7, wherein a capacitance of the capacitor in each of the first oscillation circuit unit and the second oscillation circuit unit determines the frequency range of the oscillation signal.

13. The actuator of claim 7, wherein two or more sensing coils of the first oscillation circuit unit and two or more sensing coils of the second oscillation circuit unit are provided to be symmetrical to each other in relation to a plane formed by an optical axis direction and a first direction, perpendicular to an optical axis.

14. An actuator, comprising:
a driving device configured to output a driving signal in response to an input signal and a feedback signal;
driving coils configured to move a lens barrel in two different directions perpendicular to an optical axis of the lens barrel in response to the driving signal;
detection targets disposed on the lens barrel;
two or more oscillation circuits configured to output frequencies of oscillation signals in response to a position of the detection targets; and
a determining unit configured to calculate a position of the lens barrel in the two different directions in response to the frequencies of the oscillation signals, and output the feedback signal in response to the calculation,
wherein each of the two or more oscillation circuits comprise a sensing coil and a capacitor, and
wherein an inductance of the sensing coil included in each of the two or more oscillation circuits is changed in response to movement of the lens barrel.

15. The actuator of claim 14, wherein the oscillation circuits are disposed extending in a first of the two directions on opposing sides of the lens barrel in a second of the two directions.

16. The actuator of claim 15, wherein an oscillation circuit among the oscillation circuits is configured to output a frequency of an oscillation signal in a frequency range different from a frequency range of an oscillation circuit among the oscillation circuits disposed on the opposing side of the lens barrel.

17. The actuator of claim 16, wherein the oscillation circuit among the oscillation circuits is configured to output a frequency of an oscillation signal in a frequency range same as a frequency range of another oscillation circuit among the oscillation circuits disposed on the opposing side of the lens barrel.

* * * * *